(12) United States Patent
Chirayath

(10) Patent No.: US 10,041,833 B1
(45) Date of Patent: Aug. 7, 2018

(54) SYSTEM AND METHOD FOR ACTIVE MULTISPECTRAL IMAGING AND OPTICAL COMMUNICATIONS

(71) Applicant: The United States of America as Represented by the Administrator of the National Aeronautics and Space Administration (NASA), Washington, DC (US)

(72) Inventor: Ved Chirayath, Palo Alto, CA (US)

(73) Assignee: The United States of America as Represented by the Adminstrator of the NASA, Washington, DC (US)

( * ) Notice: Subject to any disclaimer, the term of this patent is extended or adjusted under 35 U.S.C. 154(b) by 0 days.

(21) Appl. No.: 15/480,318

(22) Filed: Apr. 5, 2017

Related U.S. Application Data (60) Provisional application No. 62/318,371, filed on Apr. 5, 2016.

(51) Int. Cl.
*G01N 21/00* (2006.01)
*G01J 3/28* (2006.01)
*G01J 3/42* (2006.01)

(52) U.S. Cl.
CPC ..... *G01J 3/2823* (2013.01); *G01J 2003/2826* (2013.01); *G01J 2003/425* (2013.01)

(58) Field of Classification Search
CPC ........ G01J 3/02; G01J 3/51; G01J 3/52; G01J 3/50; G01J 3/28; G01J 3/2823; G01J 3/44; G01J 3/513
See application file for complete search history.

(56) References Cited

U.S. PATENT DOCUMENTS 6,820,979 B1 * 11/2004 Stark ...................... A61B 3/112
351/206

* cited by examiner

*Primary Examiner* — Abdullahi Nur
(74) *Attorney, Agent, or Firm* — Rhys W. Cheung; Robert M. Padilla; Mark P. Dvorscak (57) ABSTRACT

Provided is a system and method for active multispectral imaging having a transmitter that uses narrowband optical radiation to dynamically illuminate an object with modulated structured light in multiple spectral bands, and a receiver that includes an independent panchromatic imager. The transmitter and receiver can be operated in a bistatic decoupled configuration to enable passive multispectral synthesis, illumination-invariant sensing, optical communications, and the ability for the transmitter to emit a sequence of spectral bands in an order that is unknown to the receiver, and the receiver is able to passively decode the spectral identity from a band identifier embedded in the modulated structured light. The receiver passively decodes embedded high-bandwidth simplex communications while reconstructing calibrated multispectral images at video frame rates.

21 Claims, 5 Drawing Sheets

FIG. 5

SYSTEM AND METHOD FOR ACTIVE MULTISPECTRAL IMAGING AND OPTICAL COMMUNICATIONS

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

The present embodiments relate to optical instruments, more particularly, to active multispectral imaging, detection, and measurement of non-linear reflectance.

BACKGROUND OF THE INVENTION

Remote sensing technologies are used to measure electromagnetic radiation as reflected from objects to observe the object's physical properties. Remote sensing allows for the identification of materials and their composition. The measurements are typically acquired by spaceborne, airborne, handheld, or underwater sensor technologies.

Typically, the Sun is the electromagnetic radiation source whose energy is reflected by the object, and collected and measured by passive sensing instruments. In one approach for multispectral remote sensing, narrowband filters are applied over an array of sensors to detect the reflectance of an object as a function of optical wavelength in tens of spectral bands. Different materials have distinct reflectance values in different spectral bands and specific wavelengths. For example, in the detection and identification of minerals, by observing the reflectance of a material in different wavelengths, the reflectance from the material can be compared to the known spectral signatures of certain minerals to identify the presence of the mineral in the material.

One disadvantage of measuring the Sun's reflected energy in remote sensing is the effect of the Earth's atmosphere on the solar blackbody spectrum. Atmospheric gases, such as water vapor, carbon dioxide, and ozone, absorb radiation and limit the electromagnetic wavelengths available for terrestrial and aquatic remote sensing. Any such solar radiation will have first traveled through the atmosphere once to reach the target, be reflected, and traveled through the atmosphere again before reaching the sensing instrument, with sufficient amounts of the radiation absorbed by the atmosphere to affect the accuracy of the measurement of the reflectance in nontrivial ways. This phenomenon is compounded by water column absorption in the case of aquatic remote sensing, limiting the Sun's penetration depth to the top 100 meters in the ocean, for example. Other objects in the atmosphere and water column can also affect the transmission of the radiation in unpredictable ways. Accordingly, atmospheric and water column calibrations are required to estimate the interference and reverse the effects of the atmosphere and water column on the Sun's reflected light rays.

Hyperspectral remote sensing similarly observes the Sun's reflected radiation, but uses photodetectors and scanning spectrometers to resolve hundreds or even thousands of spectral bands. Even with this enhancement, passive remote sensing techniques remain limited by the ambient conditions along the optical path, by the ambient illumination spectrum, and hardware limits in optical aperture, and optical signal-to-noise ratio. Consequently, long integration times are necessary to collect the photons necessary for nocturnal and deep sea remote sensing.

Active remote sensing technologies using radio waves (Radio Detection and Ranging [RADAR]) and lasers (Light Detection and Ranging [LiDAR]) allow for remote sensing largely independent of ambient illumination conditions. Such approaches provide sufficient transmitter power over the background irradiance, and exploit phase information to overcome attenuation and distortion along the optical path. As such, receiver requirements in sensitivity, aperture, and signal-to-noise ratio are mitigated by transmitter power when using RADAR and LiDAR for active remote sensing applications. However, active remote sensing using RADAR and LiDAR cannot provide the visual images and wavelength-dependent reflectance information captured in passive remote sensing techniques across the full visible optical spectrum. Finally, materials can exhibit complex optical properties such as polarization-dependent reflectance and non-linear reflectance that can further be used to identify material properties and constituents.

It would be desired to provide a system and method for active multispectral or hyperspectral imaging, detection, and non-linear reflectance that overcomes the disadvantages described above.

BRIEF SUMMARY OF EMBODIMENTS OF THE INVENTION

Provided are systems and methods for active multispectral imaging and remote sensing. The system includes a transmitter configured to emit narrowband light in one or more spectral bands, such as near-infrared (NIR), red (R), green (G), blue (B), and ultraviolet (UV). Light emitting diodes (LEDs), laser sources, and quantum dot LEDs are examples of sources that emit narrowband light. In some embodiments, the emittance is amplitude modulated to generate one or more patterns within an irradiance cycle that constitutes a band interval. The patterns, or band identifiers, emitted in a pulse of light correspond to a particular frequency band of light, and can be used in an emittance as a unique identifier for a band of light. Multiple emittance patterns or band identifiers can be assigned to one band. The emittance patterns can further be assigned to a set of codes for encoding characters or data for transmitting messages.

The system further includes a receiver for receiving reflectance from one or more objects or surfaces that are illuminated by the emittance from the transmitter and by any ambient illumination from other sources. The receiver includes a camera or digital sensor configured to capture image data from a scene. A high-resolution panchromatic focal plane array sensor, a charge-coupled device (CCD), and a complementary metal-oxide-semiconductor (CMOS) sensor are examples of digital sensors that can be used with the system. The receiver samples the image data at a frame rate that corresponds to the frequency of the emittance cycles of the transmitter to record a sequence of frames of image data. The receiver is configured to parse the received image data to determine the band identifier and assign a band color to the image. The receiver is configured to self-calibrate to the ambient environment based on the received reflectance. The receiver is configured to automatically determine the band identifier modulation pattern from the captured narrowband and ambient reflectance, and to assign a band color to a particular interval of light data received. Based on the light reflectance and the identified band identifiers and amplitude patterns, the receiver is further configured to perform any one or more of reconstructing a color image or a sequence of color images into a multispectral or hyperspectral video, decoding a data message, measuring the spatial variation of wavelength-dependent reflectance, non-linear intensity-dependent reflectance, polarized reflectance, and ranging, and performing 3D characterization of the object's surface.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS

In the following description, numerous specific details have been set forth to provide a more thorough understanding of embodiments of the present invention. It will be appreciated however, by one skilled in the art, that embodiments may be practiced without such specific details or with different implementations for such details. Additionally, some well-known structures have not been shown in detail to avoid unnecessarily obscuring the present embodiments.

Other and further features and advantages of the present embodiments will be apparent from the following descriptions of the various embodiments when read in conjunction with the accompanying drawings. It will be understood by one of ordinary skill in the art that the following embodiments and illustrations are provided for illustrative and exemplary purposes only, and that numerous combinations of the elements of the various embodiments of the present invention are possible. Further, certain block diagrams are not to scale and are provided to show structures in an illustrative manner. Exemplary systems and processes according to embodiments are described with reference to the accompanying figures. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Oracle Corporation of Redwood City, Calif., Microsoft® Windows®, available from Microsoft Corporation of Redmond, Wash., various versions of the Unix operating system such as Linux available from a number of vendors, various embedded operating systems, or various mobile operating systems. The method may also be implemented on a multiple-processor system, or in a computing environment including various peripherals such as input devices, output devices, displays, pointing devices, memories, storage devices, media interfaces for transferring data to and from the processor(s), and the like.

Overview

Figure 1:
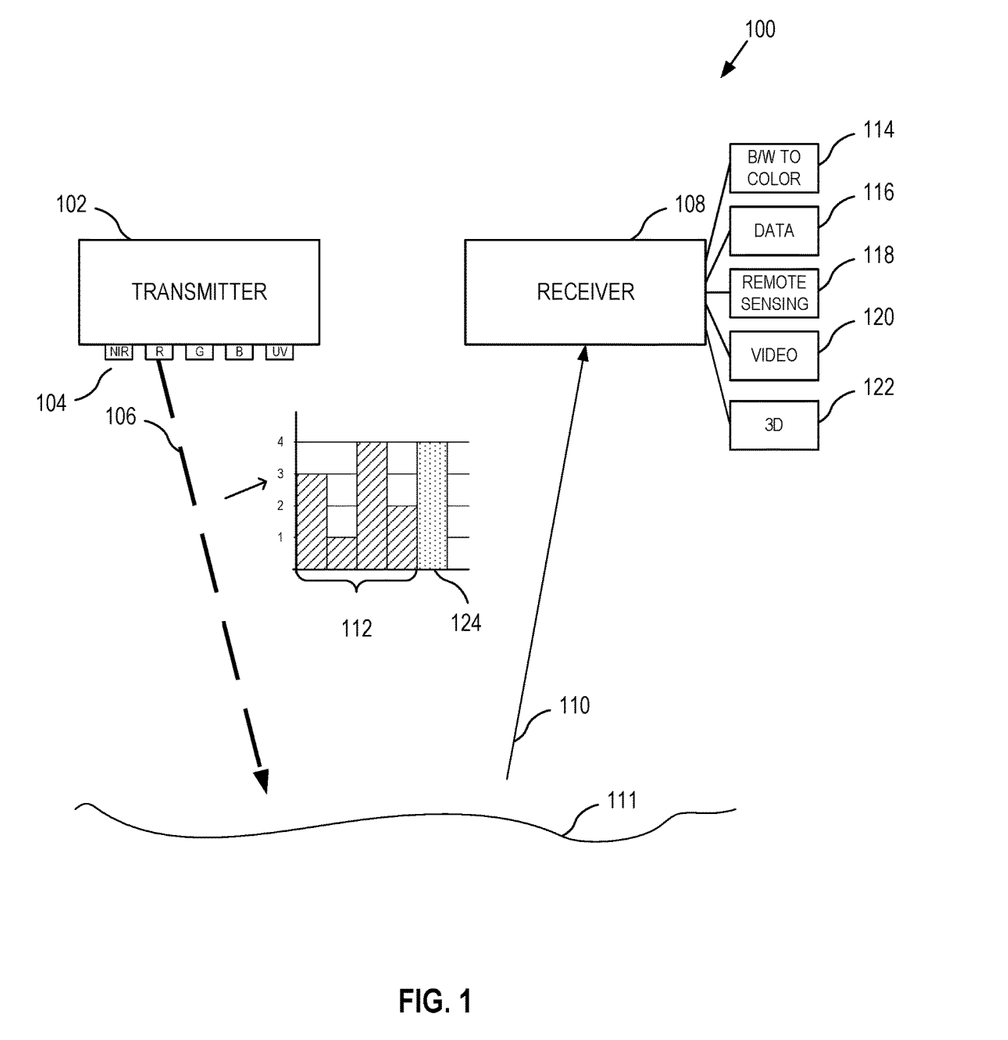
FIG. 1 is a block diagram that illustrates an example of an active sensing multispectral imaging, detection and active non-linear reflectance (MiDAR) system, according to some embodiments.

Active sensing systems and methods are provided for active multispectral or hyperspectral imaging, detection, and non-linear reflectance measurement. Features of some example embodiments are described hereinafter. FIG. 1 is a block diagram illustrating an example of some embodiments.

The system 100 includes a transmitter 102 configured to emit narrowband light from a light source, such as light emitting diodes (LEDs). In some embodiments, the transmitter includes several high-intensity LEDs 104 that emit particular spectral or color bands, such as near-infrared (NIR), red (R), green (G), blue (B), and ultraviolet (UV). In some embodiments, as many LED types as are available is the number color bands that can be used with the system. A 32-channel transmitter and 100-channel hyperspectral transmitter based on modern LEDs and laser diodes are among the possible embodiments contemplated. As different materials have distinct reflectance values of each irradiance or color band, a greater number of channels provides for a greater range of possibilities for material identification in remote sensing.

In some embodiments, the transmitter 102 is further configured to modulate the amplitude of the LED emissions while illuminating an object for multispectral imaging and remote sensing applications. The amplitude modulation allows data to be encoded into the light transmission 106 as an optical signal. A receiver 108, without an electronic or data communication link or other secondary synchronization link with transmitter 102, can thereby receive, process, and decode the optical signal in the reflectance 110 prior awareness of the color band order or data content of the light transmission 106. Accordingly, the transmitter 102 and receiver 108 allow for simultaneous in-situ, airborne and spaceborne measurements and optical communications.

In some embodiments, the optical signal is used to encode one or more band identifiers 112, or band signatures, for a spectral band, for example, red. A band identifier 112 embedded in the emittance 106 allows the receiver 108 having no other communication with the transmitter 102 to identify the spectral band upon receiving, processing, and decoding the optical signal. This provides an advantage of not necessitating a predetermined order of color bands transmitted, a temporal coordination between the transmitter and receiver, or other prior awareness by the receiver of the band transmitted, to correctly identify the received band. The embedded band identifier 112 allows the system to operate in a passive bistatic model, whereby the transmitter 102 and the receiver 108 are separated, not collocated, and not in direct electronic or digital communication, and the receiver 108 is independently configured to capture and analyze reflectance 110 from a target object. Although a bistatic model is shown and described herein, the system may be implemented in a monostatic model without departing from the spirit of the invention. The decoupling of the transmitter 102 and receiver 108 enables passive multi spectral synthesis, illumination-invariant sensing, non-linear reflectance determination, optical communications and the ability for spectral bands to be selected and customized dynamically in response to changed mission requirements.

While transmitter 102 is an active optical transmitter, receiver 108 is a passive receiver. In some embodiments, the receiver 108 configured to sense the active reflectance 110 from a target surface 111 of one or more of near-infrared, visible, or ultraviolet light.

In some embodiments, the receiver 108 has a full-frame focal plane array (FPA), such as a panchromatic focal plane array that is sensitive to all wavelengths of visible light, but records an image from the reflectance devoid of hue or spectral information. In other embodiments, the receiver 108 includes any digital imaging sensor, such as a camera using a charged-coupled device (CCD) or complementary metal-oxide-semiconductors (CMOS) that provide a special response to the frequencies emitted by the LEDs 104 of the transmitter 106.

In some embodiments, the receiver 108 further includes on-board computational systems 114-122 to process the captured reflectance. The receiver 108 further includes an image reconstruction module 114 for automated band signature identification to assign color bands to the captured frames to reconstruct the "black-and-white" images as multispectral color images. The process includes real-time radiometric calibration, using an ambient radiance calibration cycle 124 that is captured after an irradiance calibration cycle 112 to perform ambient radiance calibration and intensity normalization to determine the band signature from the reflectance 110 upon accounting for absorption of the radiation by the target material. The band signatures are identified using a set of codes corresponding to color bands. After the band signatures are identified, the receiver 114 reconstructs a multispectral image.

In some embodiments, the system provides a high-bandwidth simplex optical data-link under a range of ambient irradiance conditions, including darkness. A data decoding module 116 at receiver 108 decodes the same band identifier into a data message using a set of codes corresponding to data and text. In some embodiments, several band identifiers are assigned redundantly to the same spectral band. In some embodiments, the band identifiers are used as data units for transmitting optical data, while simultaneously identifying the color band or spectral band of the transmission, allowing optical data communications and remote sensing to be achieved from the same transmitted data unit. In some embodiments, a data unit may encode alphanumeric data to enable optical transmission of messages, calculations, scene or signal parameters, or analysis to a receiver.

In some embodiments, integration time is the time for a transmitter to transmit serially irradiance from one or more color bands, with a number of irradiance cycles of different amplitude modulation levels from each color band that are sufficient for encoding a band identifier, plus a unit of time in paused transmission after each color band to allow for measurement of ambient conditions. In these embodiments, the integration time corresponds to the time for a receiver to capture one frame of a scene. Depending on the data transmissions desired, one integration period may include transmissions of redundant or repeated color bands in order to encode the desired message through the light transmissions.

The binary function of the band identifiers is advantageous for research environments where power and capacity constraints do not permit both remote sensing instruments and communications instruments to be brought to the data gathering site, such as in deep sea, earth-orbiting, or planetary environments.

In some embodiments, emittance data encodes information about the light's color, power, and spectral characteristics, and a remote sensing module 118 uses the encoded data and the reflectance to identify the surface material and its composition.

Transmitter 102 emits coded narrowband structured illumination to generate high-frame-rate multispectral video. A video reconstruction module 120 on receiver 108 reconstructs moving visual images from a sequence of panchromatic images captured from the reflectance. In some embodiments, the framerate of the receiver is over 1500 Hz. A 3D reconstruction module 122 reconstructs the three-dimensional structure of the scene using bidirectional reflectance distribution function (BRDF) characterization and other depth determination techniques, including intensity-based ranging.

While example embodiments discussed herein include processing modules 114-122 as collocated with the sensor and housed in a single unit as receiver 108, it is understood that the processing modules may be located in a separate location from the unit housing the sensor without departing from the spirit of the invention.

In some embodiments, the system measures the spatial variation of wavelength-dependent reflectance, non-linear intensity-based reflectance, and polarized reflectance of a material. Some materials exhibit wavelength-dependent reflectance. The reflectance of such materials to electromagnetic radiation may vary due to its chemistry, material, and structural properties; in particular, a material's reflectance is dependent on the wavelength of incident electromagnetic radiation. Measurement of such wavelength-dependent reflectance can be used to create reflectance spectra that identify or characterize unique materials. This effect is readily observable as visible color and at finer detail as reflectance spectra.

Some materials exhibit non-linear intensity-based reflectance. Non-linear intensity-based reflectance occurs when materials exhibit different reflectance values as a function of the intensity, or amplitude, of incident electromagnetic radiation, independent of wavelength. Non-linear intensity-based reflectance can similarly be used to identify and characterize a unique material based on its response to varying incident electromagnetic wave amplitudes. This effect is commonly observed in nonlinear optical materials, or with high intensity light sources.

Materials may also exhibit polarization-dependent reflectance, wherein a material's wavelength-dependent reflectance varies as a function of the polarization state of the incident electromagnetic radiation. This effect is commonly observed as the glare from asphalt illuminated during the day, mitigated by using polarized eyewear.

In some embodiments, measurements taken using transmitter 102 and receiver 108 measures the wavelength-dependent reflectance, non-linear intensity-based reflectance, and polarized reflectance of a material. As discussed, narrowband illumination from transmitter 102 in the form of an amplitude modulated output is used to illuminate an object at multiple optical wavelengths. Receiver 108 records the reflectance data as panchromatic images. The decoding process is performed to reconstruct a multispectral image from these frames. Color band calibration corrects these images for the optical path length absorption to determine calibrated absolute reflectance of the material as a function of wavelength of the narrowband illumination band. By increasing the peak power in a color band per cycle and repeating a color band pattern, the non-linear intensity-dependent reflectance of a material can be measured using the same decoding and calibration steps. The receiver can decode the incident peak power value from the transmitter using the optical communications process. For polarized reflectance, the narrowband illumination source is further filtered by polarizers at different polarization angles. There are n redundant narrowband light sources for n polarization states and each is identified as a unique reflectance signature by the optical communications process. Thus, polarized reflectance is measured by the inclusion of polarized narrowband emitters and the same decoding and receiver calibration method as previously described.

Experimental tests demonstrate a 7-channel prototype consisting of a transmitter having an active array of multispectral high-intensity light-emitting diodes coupled with a state-of-the-art, high-frame-rate near-infrared (NIR) computational imager, FluidCam NIR available from the National Aeronautics and Space Administration (NASA), which functions as a receiver.

Preliminary results confirm efficient, radiometrically calibrated, high signal-to-noise ratio (SNR) active multispectral imaging in 7 channels from 365-940 nm at 2048×2048 pixels and 30 Hz. These results demonstrate a cost-effective and adaptive sensing modality, with the ability to change color bands and relative intensities in real-time, in response to changing science requirements or dynamic scenes.

Potential applications of multipurpose sensors such as the systems described herein include high-resolution nocturnal and diurnal multispectral imaging from air, space and underwater environments as well as long-distance optical communication, bidirectional reflectance distribution function (BRDF) characterization, non-linear reflectance characterization, material identification, atmospheric correction, UV/fluorescent imaging, 3D reconstruction using Structure from Motion (SfM) and underwater imaging using Fluid Lensing. Such multipurpose sensors fuse active sensing and communications capabilities, may be particularly well-suited for mass-limited robotic exploration of Earth and the solar system and represent a possible new generation of instruments for active optical remote sensing. The use of computational imaging further allows for multispectral data to be fused using SfM and Fluid Lensing algorithms to produce 3D multispectral scenes and high-resolution underwater imagery of benthic systems in the future.

MiDAR Transmitter

Figure 2:
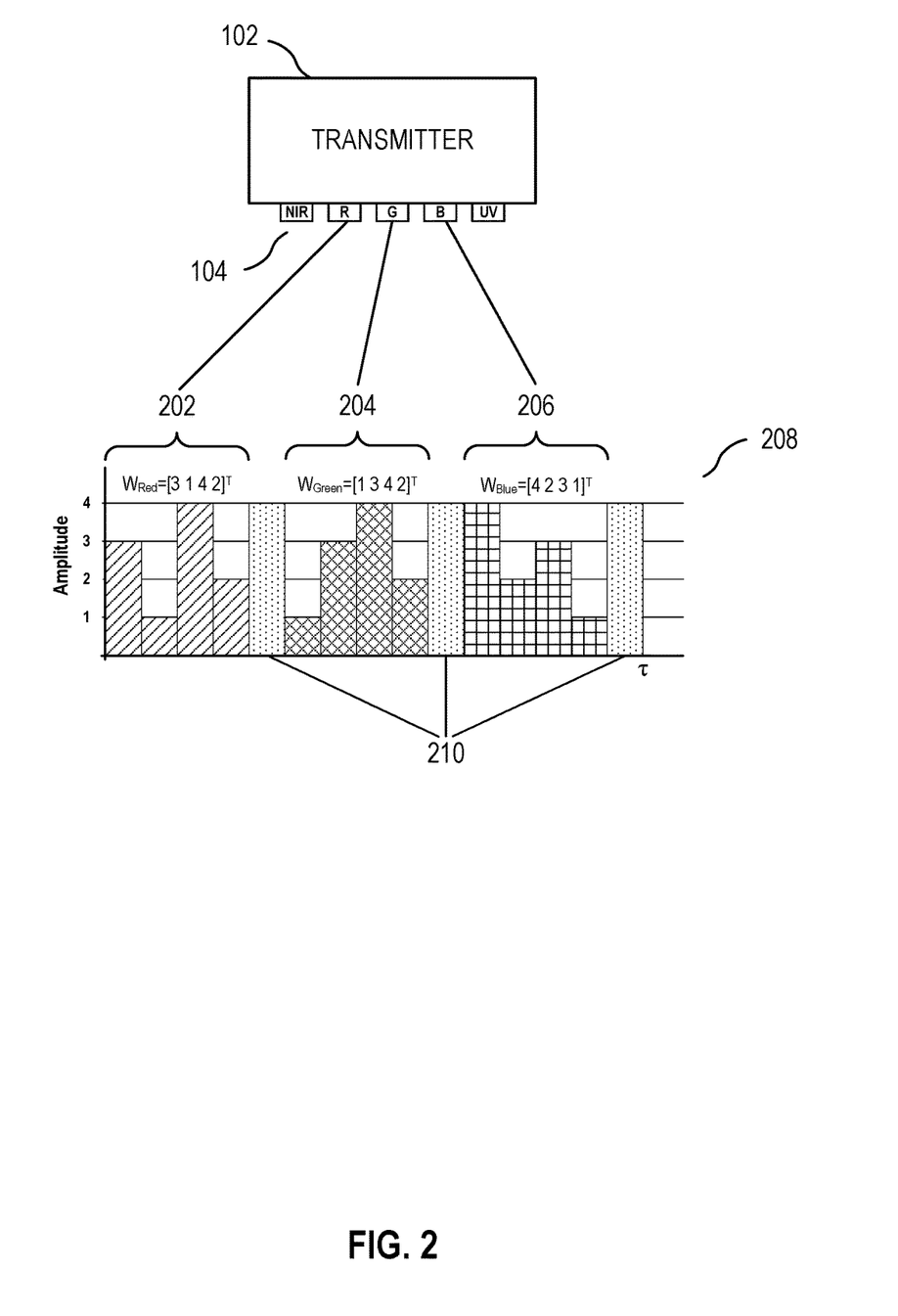
FIG. 2 is a block diagram that illustrates a transmitter system on which some embodiments may be implemented.

FIG. 2 is a block diagram that illustrates a transmitter system on which some embodiments may be implemented. Narrowband optical illumination of a target 111 at range R is achieved with an array 104 of high-intensity light emitting diodes (LEDs) grouped into N multispectral color bands, µ, for example, three multispectral color bands of Red 202, Green 204, and Blue 206. The LED array 104, coupled to transmitter 102, is driven by a periodic variable-amplitude input signal 208 to emit modulated structured light. $\phi_{e,\lambda}(P, t)G(\lambda)$ is the time-varying, emitted spectral radiant power distribution [Wnm$^{-1}$ s$^{-1}$] of transmitter 102, where $G(\lambda)$ is the gain of transmitter 102 at wavelength $\lambda$. Each color band, µ, spanning spectral range $\Delta\lambda$, is assigned a unique amplitude-modulated signature ($w_\mu$), signatures 202, 204, 206, defined by modulating the peak power in a color band, $\phi_{e,peak}$, according to coefficients in column vector $w_\mu$, consisting of n irradiance calibration cycles 202, 204, 206 per color band, α amplitude modulation levels, for example, levels 1, 2, 3, and 4, and one ambient irradiance calibration cycle 210 at the end of each color band interval $$\frac{\tau}{N}.$$

For all colors bands, these column vectors form a n×N coefficient weight matrix W. Optics are used to distribute the radiation pattern Y(x, y) uniformly across the scene while N total multispectral color bands µ=NIR, R, G, B, UV, . . . are cycled through in total integration time $$\tau = \frac{N(n+1)}{f_{Tx}}$$

seconds.

Modulating transmission power based on coefficients in the weight matrix $$W = \begin{bmatrix} w_{Red_1} & w_{Green_1} & \cdots & w_{N_1} \\ \vdots & \vdots & & \vdots \\ w_{Red_n} & w_{Green_n} & \cdots & w_{N_n} \end{bmatrix}$$

allows for passive detection, independent color band recognition and irradiance normalization by a panchromatic receiver 108. As discussed below, the receiver 108 uses the weight matrix W to determine the color band of the transmission by cross-correlating a received amplitude pattern against all column vectors to find a match for the received amplitude pattern. This scheme, subject to the constraints Equation 1, allows transmitter 102 to alter the color band order and irradiance in real-time, relying on receiver 108 to passively decode the embedded information and autonomously calibrate to changing illumination intensity. Further, band signatures 202, 204, and 206 allow the transmitter and receiver to operate in the monostatic or bistatic regime with no communication link beyond the embedded optical signal.

For additional bandwidth, color bands may have b redundant band signatures, allowing for b bits of data to be encoded at a bitrate of $$\frac{bN}{\tau}$$

bits/s. For example, the system is configured such that band signatures [3 1 4 2] and [3 2 4 1] both correspond to the Red band. The band signatures also encode two data units, for example, corresponding to two numerical digits, which can be used to encode alphanumeric characters or other data.

In some embodiments, the band signature for each color band, $\phi_{e,\mu}$, remains unique to $\mu$ across the average integrated power $\phi(t)$ (Equation 1, ii). For uniform signal-to-noise ratio (SNR) across the color bands, the average integrated power $\phi(t)$ is constant over $$\frac{\tau}{N}$$

(Equation 1, i). To maximize all three of multispectral video frame-rate, SNR and data transmission bandwidth, the optimization problem in Equation 1 is solved to minimize $\tau$.

$$\min \tau \ \& \ \max b, SNR \text{ for given } N, n, a \quad \text{(Eq. 1)}$$
subject to $$\langle \phi_{e,\lambda}(P, t)G(\lambda)\rangle = \int_{\frac{\tau}{N}} \phi_{e,\lambda}(P, t)G(\lambda)dt = const. \forall\ \mu \quad \text{(i)}$$

$$\exists\ b \in \mathbb{Z} \text{ instances where } \phi_{\mu,peak} \cdot w_\mu * \phi(t) = 1 \quad \text{(ii)}$$

$$n = ka\ \forall\ k \in \mathbb{Z} \quad \text{(iii)}$$

$$SNR_\lambda \approx const. \quad \text{(iv)}$$

Figure 3:
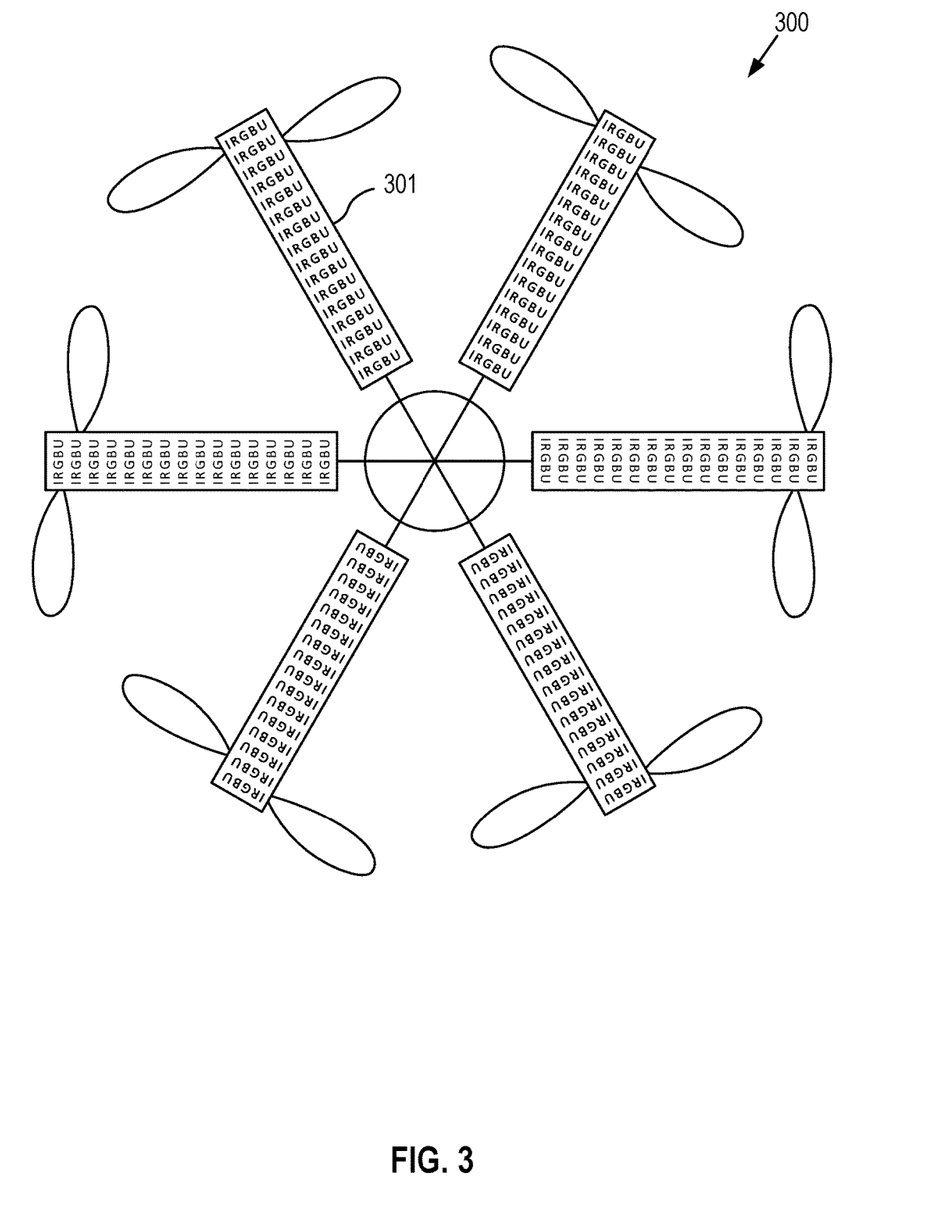
FIG. 3 is a diagram that illustrates a MiDAR transmitter and a MiDAR receiver mounted on an unmanned aerial system (UAS), according to some embodiments.

FIG. 3 is a diagram that illustrates a MiDAR transmitter 300 mounted on an unmanned aerial vehicle (UAV), according to some embodiments. In some embodiments, transmitter 300 is integrated on a multirotor UAV or fixed-wing aircraft. LEDs 301 distributed in a linear array are coupled to heatsinks passively cooled by propeller downwash.

MiDAR Receiver

Receiver 108 image reconstruction composes the final multispectral image from a weighted average of decoded frames. In some embodiments, receiver 108 comprises a passive, high-frame-rate panchromatic FPA coupled to a computational engine. Receiver 108 samples reflected structured light from the illuminated object at receiver frequency, $f_{Rx}$. In some embodiments, onboard modules digitally process the high-frame-rate image data to decode embedded simplex communication, perform in-phase intensity and color-band calibration and reconstruct a N-band calibrated multispectral scene at a framerate of $\tau$-1 Hz. In some embodiments, a FluidCam instrument, available from NASA, which is a high-frame-rate visible color and NIR computational imager, is used as receiver 108.

To reconstruct video, receiver 108 digitizes sequential panchromatic images I[x, y, t] at $\{N_x, N_y\}$ pixels and framerate $f_{Rx}$Hz. N ambient radiance calibration cycles are used to calibrate intensity and the normalized image sequence is cross correlated with the coefficient weight matrix W to detect and assign color bands. The process composes a calibrated $[N_x \times N_y] \times N \times t$ dimensional multispectral video scene consisting of N color bands, $\mu$. The multispectral video matrix, $M[x, y, \mu, t]$, is constructed from a weighted average of color-band classified panchromatic images I[x, y, t] over total integration time $\tau$.

Figure 4:
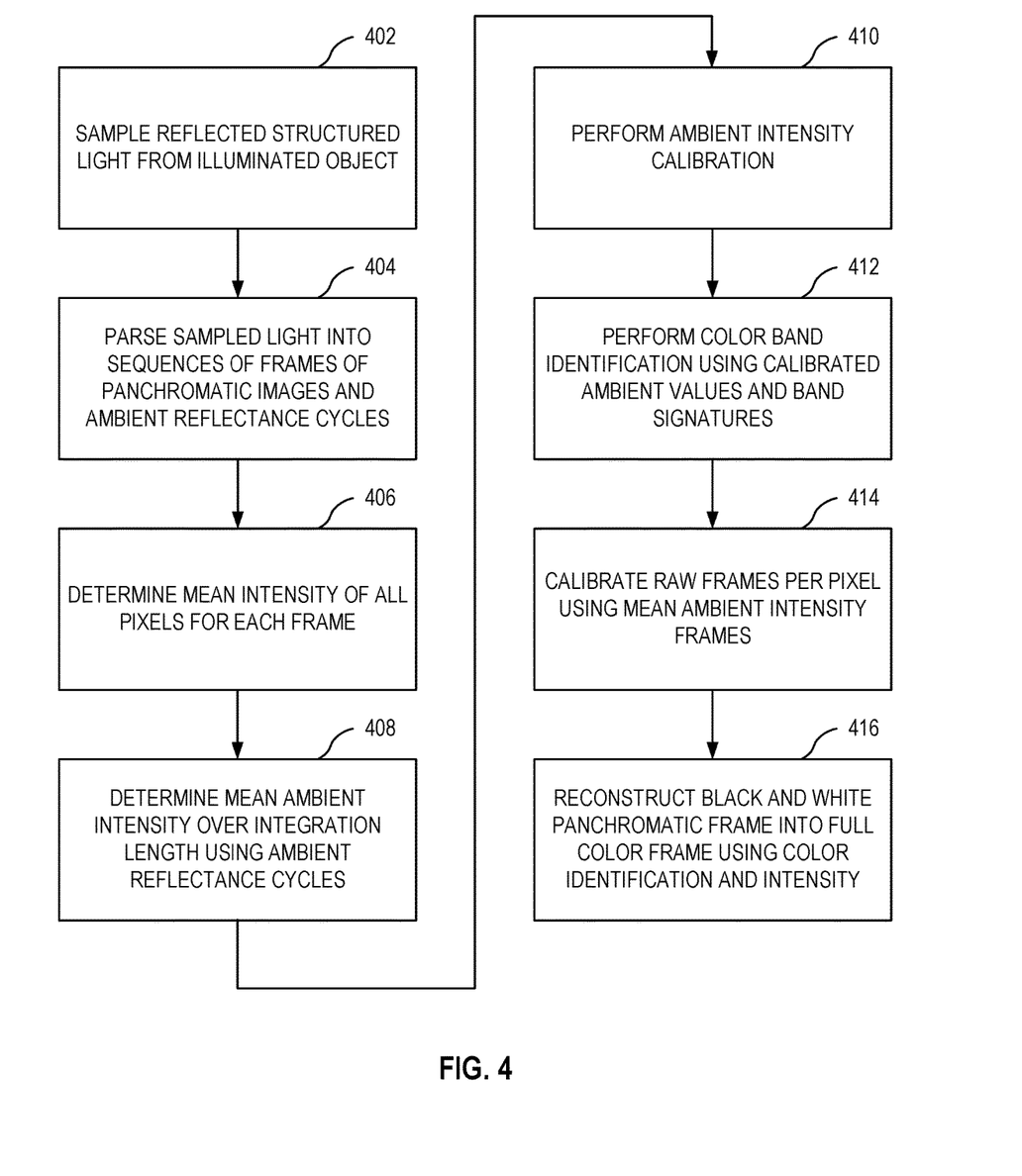
FIG. 4 is a flow diagram that illustrates a process for MiDAR multispectral reconstruction, according to some embodiments.

FIG. 4 is a flow diagram that illustrates a process for multispectral reconstruction, according to some embodiments. At step 402, receiver 108 samples reflected structured light from illuminated object. At step 404, receiver 108 parses sampled light into sequences of frames of panchromatic images and ambient reflectance cycles. At step 406, the mean intensity of all pixels for each frame is determined, and is used to form a one-dimensional (1D) signal representing the global frame amplitude over time, $$\overline{A[t]} = \frac{1}{N_x N_y} \sum_{j=1}^{N_y} \sum_{i=1}^{N_x} I[i, j, t].$$

This signal is later used to decode the color band associated with the sequence of panchromatic images I[x, y, t] with high-SNR.

At step 408, the mean ambient intensity, $$\overline{A_{ambient}[\tau_t]}$$

over an integration length $\tau$ is determined using N ambient radiance calibration cycles $L_{ambient}$. Transmitter power is turned to a minimum output for these ambient radiance cycles. These values are averaged such that $$\overline{A_{ambient}[\tau_t]} = \frac{1}{N} \sum_{k=1}^{N} \min\left( A\left[ \frac{k\tau_t}{N} - \frac{\tau}{N(n+1)}, \frac{k\tau_t}{N} \right] \right)$$

At step 410, ambient intensity calibration is performed, and $\overline{A[\tau]}$ is normalized to [0,1] over each color band interval $$\frac{\tau}{N},$$

such that $$\widehat{A_{calibrated}[t]} = \frac{\overline{A[t]} - \overline{A_{ambient}[\tau_t]}}{\max(\overline{A[t]}) - \overline{A_{ambient}[\tau_t]}}$$

At step 412, color band identification is performed using calibrated ambient values and band signatures. More specifically, color band identification is performed by cross correlation of $\widehat{A_{calibrated}[t]}$ with each column coefficient weight matrix $w_\mu$ over a moving window of color band interval $$\frac{\tau}{N}.$$

In some embodiments, the pattern of amplitudes from the reflectance, after being calibrated against the ambient reflectance, is cross-correlated with the set of all color band signatures that the transmitter has been configured to transmit. Frames that exceed a tolerance ε for a particular color band are assigned to the respective color band. For frames where $$\overline{I_{x,y,t}} * w_\mu > \varepsilon, \text{ images } I\left[x, y\left[t, \frac{\tau}{N}\right]\right]$$

are assignee to color band μ: $I_\mu[x, y, t] \subseteq I[x, y, t]$ and detected ambient intensity calibration images are assigned for color band μ: $I_{ambient,\mu}[x, y, t] \subseteq I_\mu[x, y, t]$.

At step 414, raw frames are calibrated per pixel using mean of assigned ambient intensity calibration frames, as follows:

$$I_{calibrated,\mu}[x, y, t] = I_\mu[x, y, t] - \overline{I_{ambient,\mu}[t]}.$$

At step 416, final multispectral video is reconstructed using a weighted average of the color band assigned calibrated frames $I_{calibrated,\mu}[x, y, t]$ and weight coefficients $w_\mu$ from the coefficient matrix, as follows:

$$m[x, y, \mu, t] = \frac{\sum_{t=0}^{\frac{\tau}{N}} w_\mu[t] I[x, y, t]}{n \|w_\mu[t]\|_1}.$$

In some embodiments, the process is premised upon the following physical approximations:

1. Light is reflected instantaneously from target surfaces. Phosphorescent materials are characterized by reflectance. Non-linear reflectance can be measured with increased transmission amplitude range per each color band interval.

2. Incoming light from transmitter 102 is reflected from target surface 111 at the same wavelength. Fluorescent emission requires a color receiver.

3. There are limited participating media. Primary reflectance occurs at a surface element rather than scattering within a material.

4. The bidirectional reflectance distribution function (BRDF) is a function only of three variables, $f(\theta_i, \theta_r, \phi_i-\phi_r)$, where $\theta_i, \theta_r, \phi_i, \phi_r$ are the respective incident and reflected zenith and azimuthal angles and reflectance is rotationally invariant about the target surface normal.

5. Helmholtz reciprocity applies such that BRDF satisfies $f(\theta_i, \phi_i; \theta_r, \phi_r) = f(\theta_r, \phi_r; \theta_i, \phi_i)$ 6. Transmitter power, $\phi_{e,peak}$, at range R, results in signal irradiance that is much greater than ambient irradiance, $I_{ambient}$, i.e., $I_{MiDAR} \gg I_{ambient}$.

7. Target reflectance and scene do not change on timescales faster than the receiver frequency, $f_{Rx}$. In some embodiments, $f_{Rx}$ is in the range of 90 Hz-1250 Hz for NASA FluidCams.

8. Receiver frequency $f_{Rx}$ is at least two times greater than transmitter driving frequency $f_{Tx}$, i.e., $f_{Rx} > 2f_{Tx}$.

SNR of Ideal System

In the limit of an ideal system in example embodiments, the SNR of a monostatic MiDAR system at a particular wavelength, λ, is proportional to the expression in Equation 2. In the case of an ideal system, where (1) there are negligible losses from transmission, absorption, reflection, scattering and the optical train, (2) the receiver's FPA readout noise and dark current are much less than the background photon count, and (3) the FPA has an ideal quantum efficiency, the SNR can be simplified, as follows:

$$SNR_\lambda \propto \frac{\phi_{peak}(\lambda) G(\lambda) \sqrt{\frac{A_r \tau \lambda}{hc(n+1)}} \left(\frac{n}{NR^4} \sqrt{\frac{n}{a}} \sum_{i=1}^{a} \frac{i}{a}\right)}{\sqrt{\phi_{peak}(\lambda) G(\lambda) \left(\frac{n}{NR^4} \sqrt{\frac{n}{a}} \sum_{i=1}^{a} \frac{i}{a}\right) + L_{ambient}(\lambda) \Omega_{FOV}}} \quad \text{(Eq. 2)}$$

Idealized SNR proportionality for a color band at wavelength λ where $\phi_{peak}(\lambda)$ is the peak power input to transmitter 102 at wavelength λ and $G(\lambda)$ is the gain of transmitter 102 at wavelength λ. $A_r$ is the receiver area, $\Omega_{FOV}$ is the field of view, $L_{ambient}(\lambda)$ is the ambient radiance at wavelength λ and R is the range.

SNR of Non-Ideal System

An SNR expression for monostatic, non-ideal MiDAR systems is derived as follows.

The signal-to-noise ratio of a physical measurement can be defined as the ratio of signal power, $P_{signal}$ [W], to noise power, $P_{noise}$ [W], such that $$SNR = \frac{P_{signal}}{P_{noise}}.$$

In the case of photodetectors, such as CCD and CMOS focal plane arrays, energy in the form of photons is converted to electric charges via the photoelectric effect. Due to the discrete nature of photons and the electric charge, power is quantized by the measure of counts, n [#], detected at the photodetector leading to discrete shot-noise modelled by a Poisson distribution. In the case of predominantly transmitted photons generating counts, $SNR \propto \sqrt{n_{transmitted}}$. However, focal plane arrays are subject to internal noise sources as well, principally the dark current (proportional to integration time), $n_{dark}$, and read noise, $n_{read}$. Further, MiDAR transmitter and receiver losses arise from physical interactions along the optical path that vary as a function of wavelength, time, geometry and range. Taking into account the final number of transmitted signal counts, $n_t$, and background counts, $n_{background}$, the SNR expression for a monostatic MiDAR instrument at wavelength is:

$$SNR_\lambda = \frac{n_t}{\sqrt{n_t + n_{background} + n_{dark} + n_{read}}}, \text{ where}$$

$$n_t = \int\int\int_{\frac{A_r}{R^2}} \int\int_{\frac{\tau}{N}, \Delta, \lambda, R} \frac{\phi_{e,\lambda}(P, t) G(\lambda, \theta, \varphi)}{(4\pi R^2)^2} \left(\frac{\lambda}{hc}\right)\left(\frac{A_T}{A_S}\right)$$

$$\left(\frac{\rho(\lambda)}{\pi}\right) T_a(r)^2 \beta_\omega(r) \zeta(R) T_{optical}(\lambda) \eta_{quantum}(\lambda) dr d\lambda dt d\theta d\varphi$$

$$n_{background} = \int\int_{\tau, \forall, \lambda} L_{ambient,\lambda}(\phi_{ambient,\lambda}, t) \left(\frac{\lambda}{hc}\right)$$

$$A_r \Omega_{FOV} T_{optical}(\lambda) \eta_{quantum}(\lambda) d\lambda dt$$

-continued $$n_{dark} = \int_\tau D dt, n_{read} = N_r^2$$

This expression yields the SNR of a MiDAR color channel μ=[Δλ] over MiDAR integration time per color band, $$\frac{\tau}{N}.$$

$\phi_{e,\lambda}(P,t)$ is the time-varying, spectral emitted radiant power distribution input to the MiDAR transmitter [Wnm$^{-1}$ s$^{-1}$]. The gain of the MiDAR transmitter, $G(\lambda, \theta, \varphi)$, is a function of the MiDAR transmitter efficiency, $E_{transmitter}(\lambda)$, and directivity, $D(\theta, \varphi)$, such that $G(\lambda, \theta, \varphi) = E_{transmitter}(\lambda) D(\theta, \varphi)$. h is Planck's constant, c is the speed of light in vacuum.

$$\frac{A_T}{A_S}$$

is the ratio of the area of the target surface normal to the MiDAR transmitter, $A_T$, and the illuminated spot size, As.

$$\frac{A_r}{R^2}$$

is the projected solid angle of MiDAR receiver [sr].

$$\frac{\rho(\lambda)}{\pi}$$

is the Lambertian target reflectance per solid angle [sr$^{-1}$]. $T_\alpha(R)$ is the one-way atmospheric path transmittance. $\beta_\omega(r)$ is the angular scattering coefficient [m$^{-1}$ sr$^{-1}$] $T_{optical}(\lambda)$ is the optical transmittance of the MiDAR receiver as a function of wavelength. $\zeta(R)$ is the overlap function for the MiDAR transmitter and receiver. $\eta_{quantum}(\lambda)$ is the quantum efficiency of the FPA as a function of wavelength. $L_{ambient, \lambda}(\phi_{ambient,\lambda},t)$ is the time-dependent spectral ambient irradiance [Wm$^{-2}$ sr$^{-1}$ nm-1]. D is the dark current [e$^-$/pixel/second] and $N_r$ is the read noise [e$^-$rms/pixel].

MiDAR Optical Communications Decoding

Additional simplex communications may be simultaneously embedded in the MiDAR transmitter's spectral radiant power distribution, $\phi_{e,\lambda}(P, t)$. By creating b redundant MiDAR color signatures $\phi_{e,\mu}$, simplex data can be transmitted at a minimum rate of $$\frac{bN}{\tau}$$

bit/s with no loss to MiDAR multispectral image SNR. The simplest case of amplitude modulated data transmission can be accomplished using the following process:

For frames where $$\overline{\vphantom{x}} * w_{\mu,b} > \varepsilon \text{ images } I\left[x, y, \left[t, \frac{\tau}{N}\right]\right]$$

are assigned to color band μ and record bit b.

For a FluidCam NIR based MiDAR receiver with $f_{Rx}$=1550 Hz, N=32 color bands, α=n=5 amplitude modulation and calibration cycles and b=10 redundant MiDAR signatures, this algorithm can achieve a data-rate of 2.58 kbps. Using a passive color sensor as the MiDAR receiver, such as the FluidCam Color with K color channels, this bandwidth can be increased by simultaneous transmission of multiple MiDAR color bands. In the case that a MiDAR receiver has K=N matching color bands, the data rate increases to $$\frac{bN^2}{\tau}$$

bits/s, or 82.67 kbps.

MiDAR can also be used for long-range optical communications using this methodology with the MiDAR receiver pointed directly at the MiDAR transmitter for increased gain. The SNR for b bits of data transmitted at wavelength A is then proportional to $$SNR_\lambda \propto \frac{\phi_{peak}(\lambda)G(\lambda)\sqrt{\frac{A_r\tau\lambda}{hc(n+1)}}\left(\frac{n}{NR^2}\sqrt{\frac{n}{a}}\sum_{i=1}^{a}\frac{i}{a}\right)}{\sqrt{\phi_{peak}(\lambda)G(\lambda)\left(\frac{n}{NR^2}\sqrt{\frac{n}{a}}\sum_{i=1}^{a}\frac{i}{a}\right) + L_{ambient}(\lambda)\Omega_{FOV}}}$$

Figure 5:
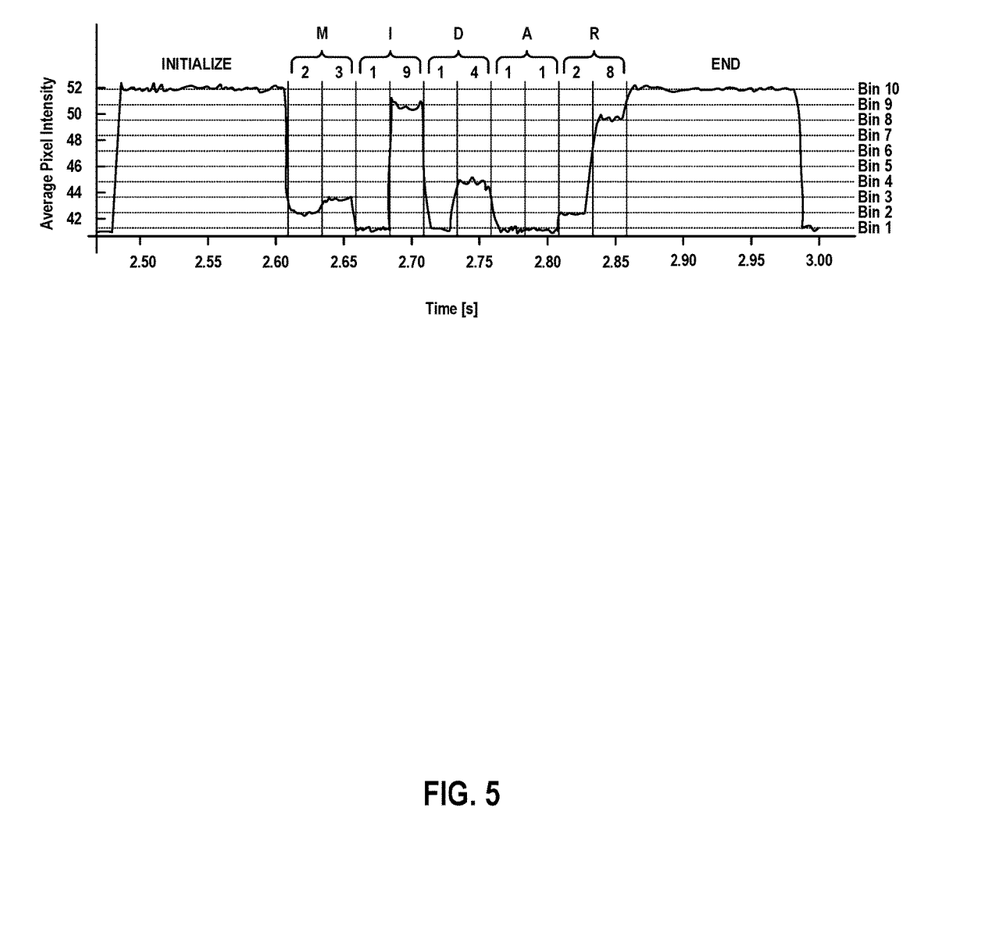
FIG. 5 is a graph that illustrates an example of a MiDAR optical communication message, according to some embodiments.

FIG. 5 is a graph that illustrates an example of a MiDAR optical communication message, according to some embodiments. The average pixel intensity of the color band transmissions is used as the amplitude modulation level. The message is encoded using base-10, two-digit character encoding, as follows:

A = 11
B = 12
C = 13
D = 14
E = 15
F = 16
G = 17
H = 18
I = 19
J = 20
K = 21
L = 22
M = 23
N = 24
O = 25
P = 26
Q = 27
R = 28
S = 29
T = 30
U = 31
V = 32
W = 33
X = 34
Y = 35
Z = 36

In this example, the message "MIDAR" are transmitted using a=10 amplitude modulation levels and n=1 calibration cycles from the code 2 3 1 9 1 4 1 1 2 8 that was transmitted through ten amplitude modulation levels. In some embodiments, each numerical digit corresponds to a unique amplitude modulated signature that also corresponds to a band identifier.

Example: 5-Channel Laboratory Prototype

A basic experiment was conducted to demonstrate a bistatic instrument based on the prototype 5-channel transmitter and FluidCam NIR receiver. The experiment was designed to validate multispectral reconstruction and optical communications decoding algorithms and theory. A 10×15 cm multispectral test target was positioned 0.35 m from the MiDAR transmitter and 2 m from the FluidCam NIR under constant diffuse, broad-spectrum ambient lighting conditions of ~1 W/m$^2$. MiDAR parameters for this experiment were: N=5, $f_{Tx}$=100 Hz, n=α=4, {$N_x$, $N_y$}={640, 480}, $f_{Rx}$=365 Hz, τ=0.25 s.

The MiDAR transmitter spectral radiant power distribution, $\phi_{e,\lambda}$(P, t) is produced using a 5-channel array of narrowband LEDs, centered at UV=405 nm, visible (B=458 nm, G=520 nm, R=615 nm) and NIR=940 nm wavelengths with full-width-half maximum (FWHM) values of Δλ=10 nm, 25 nm, 35 nm, 15 nm and 37 nm, respectively. The LED array is driven by microsecond, pulse-width-modulated (PWM) signals generated by an Arduino Uno microprocessor with high-current switching performed by MOSFETs. LED power per color was chosen to compensate for transmitter gain losses, G(λ) and receiver losses such that $P_{NIR}$=2.38 W, $P_{Red}$=1.39 W, $P_{Green}$=3.37 W, $P_{Blue}$=1.65 W, and $P_{UV}$=1.89 W.

The MiDAR receiver was a modified NASA FluidCam NIR high-resolution computational imager. FluidCam NIR is based on a CMOS focal plane array capable of capturing 4 megapixel, full-frame, 8-bit panchromatic images at ~370 MB/s (2048×2048 at 90 Hz to 190×120 at 1250 Hz). FluidCam NIR has built-in multicore CPU and GPU units for onboard computation, including MiDAR multispectral reconstruction, structure from motion and MiDAR optical communication decoding algorithms.

Preliminary results using the prototype 5-channel MiDAR transmitter and FluidCam NIR receiver confirm efficient, radiometrically calibrated, high signal-to-noise ratio (SNR) active multispectral imaging in 5 channels from 405-940 nm at 640×480 pixels and 30 Hz.

Remote sensing of the electromagnetic (EM) spectrum over the past century, from in-situ imaging to airborne and space-borne observations, has facilitated detailed global observations of not only Earth, its natural resources and the environment, but also revealed worlds beyond from roving platforms on Mars to satellite flybys of Pluto. Multi spectral images, produced by capturing emitted, reflected and scattered light from objects at multiple frequencies across the electromagnetic spectrum, are the primary measurement performed in modern remote sensing. The systems and methods described herein produces multispectral image data that are used directly to make vital measurements of Earth's climate, oceans, surface materials and ecosystem health, among other applications.

Other features, aspects and objects of the invention can be obtained from a review of the figures and the claims. It is to be understood that other embodiments of the invention can be developed and fall within the spirit and scope of the invention and claims.

The foregoing description of embodiments of the present invention has been provided for the purposes of illustration and description. It is not intended to be exhaustive or to limit the invention to the precise forms disclosed. Various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A system for multispectral imaging, detection, and active reflectance, the system comprising:
   a transmitter comprising one or more sets of narrowband light emitters, the transmitter configured to cause an optical output of at least a band of light in a transmitted amplitude-modulated pattern, wherein the transmitted pattern is associated with the band of light; and
   a receiver having a sensor configured to detect reflectance of light from one or more objects, the receiver configured to determine the band of light of the reflectance by identifying the received amplitude-modulated pattern in the reflectance, matching the received pattern with the transmitted pattern, and assigning the received pattern to an associated color band based on the matching.

2. The system of claim 1, wherein the transmitted pattern is further associated with a code corresponding to one or more data units, and the receiver is configured to decode the received pattern into the one or more data units by identifying the received amplitude-modulated pattern in the reflectance, matching the received pattern with the transmitted pattern, and assigning the received pattern to an associated data unit based on the matching.

3. The system of claim 1, wherein matching the received pattern with the transmitted pattern comprises:
   sampling the reflectance from an object that is illuminated by the transmitter;
   parsing the sampled reflectance into a plurality of frames of panchromatic images, wherein each frame is captured over one color band interval;
   determining a mean intensity of all pixels of a frame for each frame of the plurality of frames;
   determining a mean ambient intensity of ambient reflectance periods;
   calibrating the mean intensity of all pixels of the frame against the mean ambient intensity to determine a calibrated mean intensity for the frame; and
   correlating the calibrated mean intensity with a set of amplitude values associated with color bands to match the received pattern with the transmitted pattern.

4. The system of claim 1, wherein the sensor comprises a panchromatic sensor.

5. The system of claim 1, wherein the receiver is configured to reconstruct a color image from at least three panchromatic images of the same scene, wherein the at least three panchromatic images are identified to be captured from reflectance of a red band of light, a green band of light, and a blue band of light, respectively, wherein the red band, the green band, and the blue band were outputted from the transmitter.

6. The system of claim 1, wherein the narrowband light emitters include an array of light-emitting diodes emitting light in a plurality of spectral bands.

7. The system of claim 1, where in the narrowband light emitters include laser sources.

8. The system of claim 1, where in the narrowband light emitters include quantum dot light-emitting diodes.

9. The system of claim 1, wherein the narrowband light emitters are driven by pulse-width-modulated signals.

10. The system of claim 1, wherein transmitter is configured to cause the output of a sequence of bands of light, and the receiver is configured to determine the sequence of the bands of light from the reflectance without prior knowledge of the sequence's order.

11. A system for multispectral imaging, detection, and active reflectance, the system comprising:
 a transmitter comprising one or more sets of narrowband light emitters, the transmitter configured to cause an optical output of at least a band of light in a transmitted amplitude-modulated pattern, wherein the transmitted pattern is associated a data unit; and
 a receiver having a sensor configured to detect reflectance of light from one or more objects, the receiver configured to determine the data unit of the reflectance by identifying the received amplitude-modulated pattern in the reflectance, matching the received pattern with the transmitted pattern, and assigning the received pattern to an associated data unit based on the matching.

12. A method for multispectral imaging, detection, and active reflectance, the system comprising:
 outputting, from one or more sets of narrowband light emitters of a transmitter, an optical output of at least a band of light in a transmitted amplitude-modulated pattern, wherein the transmitted pattern is associated with the band of light; and
 detecting, by a receiver having a sensor, reflectance of light from one or more objects;
 determining, by the receiver, the band of light of the reflectance by identifying the received amplitude-modulated pattern in the reflectance, matching the received pattern with the transmitted pattern, and assigning the received pattern to an associated color band based on the matching.

13. The method of claim 12, wherein the transmitted pattern is further associated with a code corresponding to one or more data units, and the receiver is configured to decode the received pattern into the one or more data units by identifying the received amplitude-modulated pattern in the reflectance, matching the received pattern with the transmitted pattern, and assigning the received pattern to an associated data unit based on the matching.

14. The method of claim 12, wherein matching the received pattern with the transmitted pattern comprises:
 sampling the reflectance from an object that is illuminated by the transmitter;
 parsing the sampled reflectance into a plurality of frames of panchromatic images, wherein each frame is captured over one color band interval;
 determining a mean intensity of all pixels of a frame for each frame of the plurality of frames;
 determining a mean ambient intensity of ambient reflectance periods;
 calibrating the mean intensity of all pixels of the frame against the mean ambient intensity to determine a calibrated mean intensity for the frame; and
 correlating the calibrated mean intensity with a set of amplitude values associated with color bands to match the received pattern with the transmitted pattern.

15. The method of claim 12, wherein the sensor comprises a panchromatic sensor.

16. The method of claim 12, further comprising reconstructing a color image from at least three panchromatic images of a scene, wherein the at least three panchromatic images are identified to be captured from reflectance of a red band of light, a green band of light, and a blue band of light, respectively, wherein the red band, the green band, and the blue band were outputted from the transmitter.

17. The method of claim 12, wherein the narrowband light emitters include an array of light-emitting diodes emitting light in a plurality of spectral bands.

18. The method of claim 12, where in the narrowb and light emitters include laser sources.

19. The method of claim 12, where in the narrowband light emitters include quantum dot light-emitting diodes.

20. The method of claim 12, wherein the narrowband light emitters are driven by pulse-width-modulated signals.

21. The method of claim 12, wherein transmitter is configured to cause the output of a sequence of bands of light, and the receiver is configured to determine the sequence of the bands of light from the reflectance without prior knowledge of the sequence's order.

* * * * *